United States Patent
Fay, II

(10) Patent No.: US 10,091,924 B2
(45) Date of Patent: Oct. 9, 2018

(54) REAR-MOUNTED SWINGING TOW HITCH FOR SELF-PROPELLED WINDROWER

(71) Applicant: CNH Industrial America LLC, New Holland, PA (US)

(72) Inventor: Jeffrey B. Fay, II, Wilmington, DE (US)

(73) Assignee: CNH Industrial America LLC, New Holland, PA (US)

( * ) Notice: Subject to any disclaimer, the term of this patent is extended or adjusted under 35 U.S.C. 154(b) by 34 days.

(21) Appl. No.: 14/980,100

(22) Filed: Dec. 28, 2015

(65) Prior Publication Data

US 2017/0181366 A1    Jun. 29, 2017

(51) Int. Cl.
| | |
|---|---|
| A01B 73/00 | (2006.01) |
| A01D 67/00 | (2006.01) |
| B60D 1/54 | (2006.01) |
| B60D 1/46 | (2006.01) |
| A01B 59/042 | (2006.01) |
| A01B 63/32 | (2006.01) |
| B60D 1/167 | (2006.01) |
| A01D 75/00 | (2006.01) |
| B60D 1/00 | (2006.01) |

(52) U.S. Cl.
CPC .......... *A01B 73/005* (2013.01); *A01B 59/042* (2013.01); *A01B 63/32* (2013.01); *A01D 67/005* (2013.01); *A01D 75/002* (2013.01); *B60D 1/167* (2013.01); *B60D 1/46* (2013.01); *B60D 2001/008* (2013.01)

(58) Field of Classification Search
CPC ...... B60D 1/54; B60D 1/06; B60D 2001/542; B60D 2001/544; B60D 2001/546; B60D 1/1675; B60D 1/167; B60D 1/46; A01B 73/005; A01B 59/042; A01B 63/32; A01D 67/005; A01D 75/002
USPC ............ 280/491.1–491.4, 493; 56/162, 14.9, 56/15.6
See application file for complete search history.

(56) References Cited

U.S. PATENT DOCUMENTS

| | | | |
|---|---|---|---|
| 2,944,836 A | | 7/1960 | Matthews |
| 3,281,162 A | * | 10/1966 | Carson ................... B60D 1/167 280/479.3 |
| 3,565,461 A | | 2/1971 | Jones |
| 4,869,521 A | * | 9/1989 | Johnson ................... B60D 1/54 280/491.1 |
| 6,712,381 B1 | | 3/2004 | Moss |
| 6,729,637 B2 | * | 5/2004 | Wolters ................... B60D 1/02 280/491.1 |
| 7,219,915 B2 | * | 5/2007 | Christensen ............. B60D 1/46 280/490.1 |
| 7,677,588 B2 | * | 3/2010 | Coers ..................... B60D 1/155 280/475 |
| 7,793,967 B2 | * | 9/2010 | McConnell ............. B60D 1/06 224/496 |

(Continued)

*Primary Examiner* — John Weiss
(74) *Attorney, Agent, or Firm* — Patrick M. Sheldrake

(57) ABSTRACT

A hitch assembly for use by an agricultural machine, in particular a self-propelled windrower, allowing the adjustable position of a hitch for use in both the towing of implements during field operations and the transportation of implements from one location to another. The adjustable hitch advantageously provides stability during the transportation position and is up and out of the way of crop flow during field use.

13 Claims, 4 Drawing Sheets

(56) References Cited

U.S. PATENT DOCUMENTS

| | | | |
|---|---|---|---|
| 7,909,350 B1 * | 3/2011 | Landry | B60D 1/06 |
| | | | 280/416.1 |
| 8,419,039 B1 * | 4/2013 | Magalhaes | B60D 1/46 |
| | | | 280/478.1 |
| 8,496,070 B2 | 7/2013 | Kollath | |
| 9,308,838 B2 * | 4/2016 | Miller | B60N 2/2806 |
| 2006/0284396 A1 * | 12/2006 | Smith | B60D 1/46 |
| | | | 280/490.1 |
| 2014/0312595 A1 | 10/2014 | Knowles et al. | |

* cited by examiner

REAR-MOUNTED SWINGING TOW HITCH FOR SELF-PROPELLED WINDROWER

BACKGROUND OF THE INVENTION

1. Field of the Invention

The present invention relates to agricultural vehicles such as self-propelled windrowers, and, more particularly, to the securing of towable implements to such vehicles.

2. Description of the Related Art

An agricultural vehicle known as a "windrower" is used to cut crops in an agricultural field. Some of the crops processed by windrowers include hay, forage, and other small-grain crops. As the windrower moves through the field of crops, the plants are cut and typically moved toward the center of the path of the windrower. The cut crops are later harvested in a secondary operation.

A particular type of windrower is a "self-propelled windrower". As the name implies, a self-propelled windrower includes a cutting apparatus on the front of a chassis which is propelled by a motor. The cutting apparatus is at the front of the chassis as the windrower proceeds through the field, which therefore eliminates the damage to the crops that would be encountered if the wheels of the windrower preceded the cutting apparatus.

As previously stated, the cut crop left behind the windrower is typically harvested at a later time. Because the cut crop may be exposed to adverse conditions, primarily high winds, it is often desirable to subject the cut crop to a secondary operation where it is somewhat compacted and made more impervious to the effects of wind, one such effect being scattered out of place where it is easily accessible for harvesting. An implement used to achieve such a secondary operation is called a "swath roller". A swath roller is typically towed behind the self-propelled windrower, so that the newly-cut crop can be immediately stabilized as the swath roller rolls over it.

The swath roller can be coupled to the self-propelled windrower by a hitch. Necessarily, the hitch attached to the windrower must be high enough that it does not get in the way of the crop which has just been cut and deposited in a mounded configuration, causing damage or displacement of the crop. Such a high location of the hitch, however, precludes it from being able to be used to tow other implements in non-field operations. For example, it may be desirable for the self-propelled windrower to tow a wagon, trailer, header, or other implement from field to field on public roads. Typically, the hitch location for the aforementioned implements is located at a lower position to lend stability to the towed implement, so the self-propelled windrower with a high-located hitch is unable to tow them. Instead, another agricultural machine such as a tractor typically is used to tow those implements. Alternatively, a separate hitch can be installed on the self-propelled windrower, which is cumbersome, time-consuming, and necessitates storage during field use.

What is needed in the art is a hitch assembly that can be used on self-propelled windrowers to tow implements such as swath rollers in an agricultural field, as well as transport other implements from one location to another.

SUMMARY OF THE INVENTION

The present invention provides an adjustable hitch system for an agricultural vehicle, whereby the same hitch can be used for both towing a field implement as well as transporting other implements from one location to another.

The invention in one form is directed to a hitch assembly, including a frame with at least one hitch receiver pivotally mounted to at least one bracket attached to the chassis of an agricultural vehicle, whereby the hitch receiver can be rotated and locked in a generally downward vertical position enabling it to be used to tow and transport implements from one location to another, or the hitch receiver can be rotated and locked in a generally horizontal position enabling it to tow implements such as swath rollers in an agricultural field. The assembly is manually rotated and locked into place with a removable pin.

The invention in another form is directed to a hitch assembly, including a frame with at least one hitch receiver pivotally mounted to at least one bracket attached to the chassis of an agricultural vehicle, whereby the hitch receiver can be rotated and locked in a generally downward vertical position enabling it to be used to tow and transport implements from one location to another, or the hitch receiver can be rotated and locked in a generally horizontal position enabling it to tow implements such as swath rollers in an agricultural field. The assembly is rotated and locked into place by an electrical, hydraulic, or pneumatic apparatus which is controllable remotely or at the source.

An advantage of the present invention is the ability to use the same hitch to achieve the two tasks of towing implements during field use or transporting implements from one location to another. No extra hitch is needed, which would be cumbersome and necessitate storage of the unused hitch.

Another advantage of the present invention is the operator is able to remain in the cab at the same position during field use of the self-propelled windrower or while using it to transport implements from one location to another; that is, the self-propelled windrower need not be operated in a reverse-to-field direction for such transportation.

Yet another advantage of the present invention is the ability for the hitch assembly to be rotated out of the way of the crop flow while being used in the field.

Still another advantage of the present invention is that it is capable of being retrofitted onto certain agricultural vehicles with no hitch.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "crop", "vehicle", and "implement" are used principally throughout this specification for convenience; but it is to be understood that these terms are not intended to be limiting. Thus "crop" refers to any agricultural plant that can be harvested; "vehicle" refers to any agricultural vehicle unless specified; and "implement" refers to any piece of agricultural equipment such as headers, wagons, trailers, rollers, etc. Also the terms "forward", "rearward", "left" and "right", when used in connection with the agricultural vehicle and/or components thereof are usually determined with reference to the direction of forward operative travel of the vehicle, but again, they should not be construed as limiting. The terms "longitudinal" and "transverse" are determined with reference to the fore-and-aft direction of the agricultural vehicle and are equally not to be construed as limiting.

Figure 1:
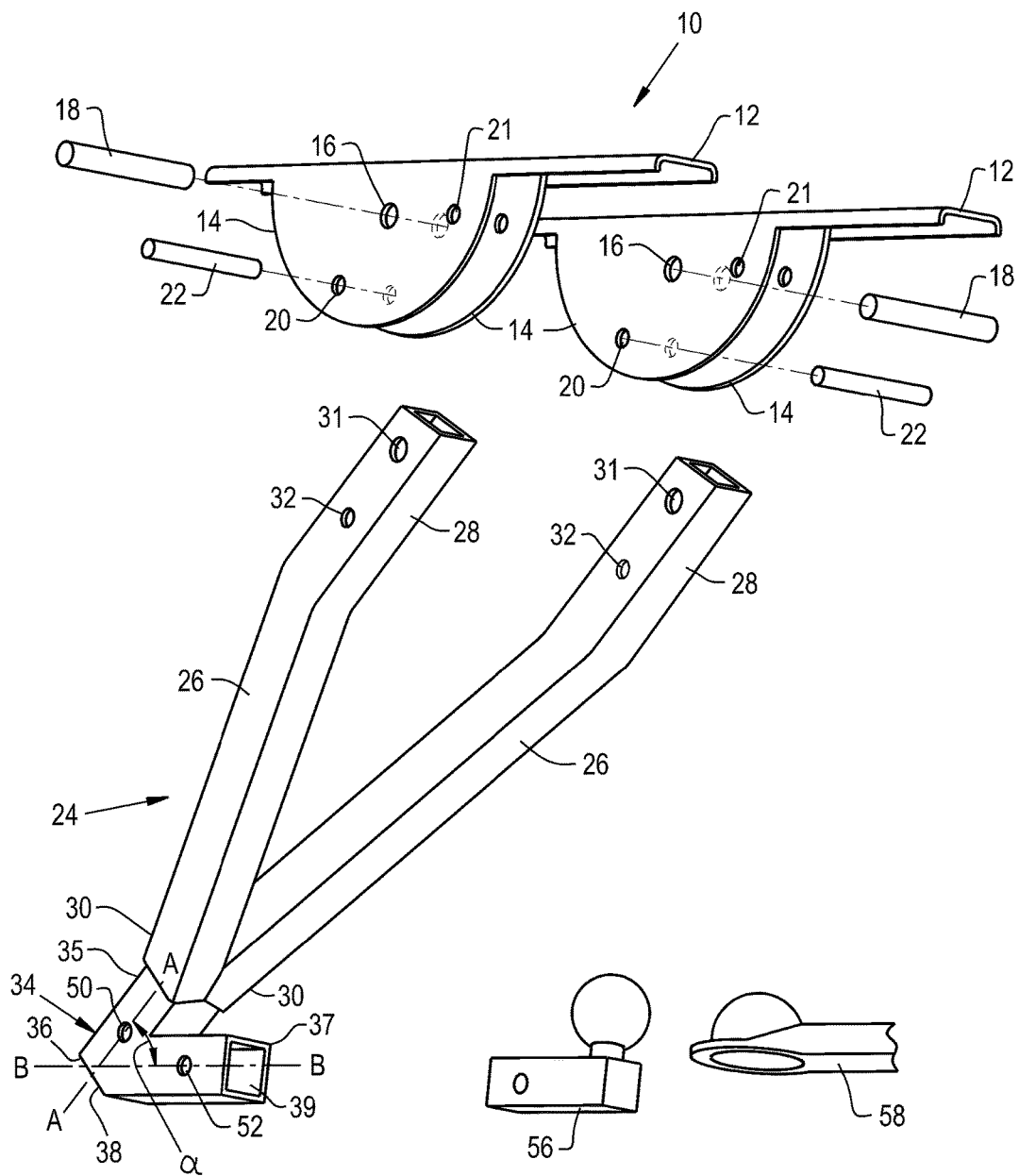
FIG. 1 is an exploded view of an embodiment of a hitch system of the present invention in a transportation configuration.

Referring now to the drawings, and more particularly to FIG. 1, there is shown a hitch system 10 including brackets 12, flanges 14, detachable locking pins 18 and 22, frame 24, and hitch shaft receiver 34. The hitch system 10 is shown in a transportation configuration (FIG. 3), described below.

Figure 3:
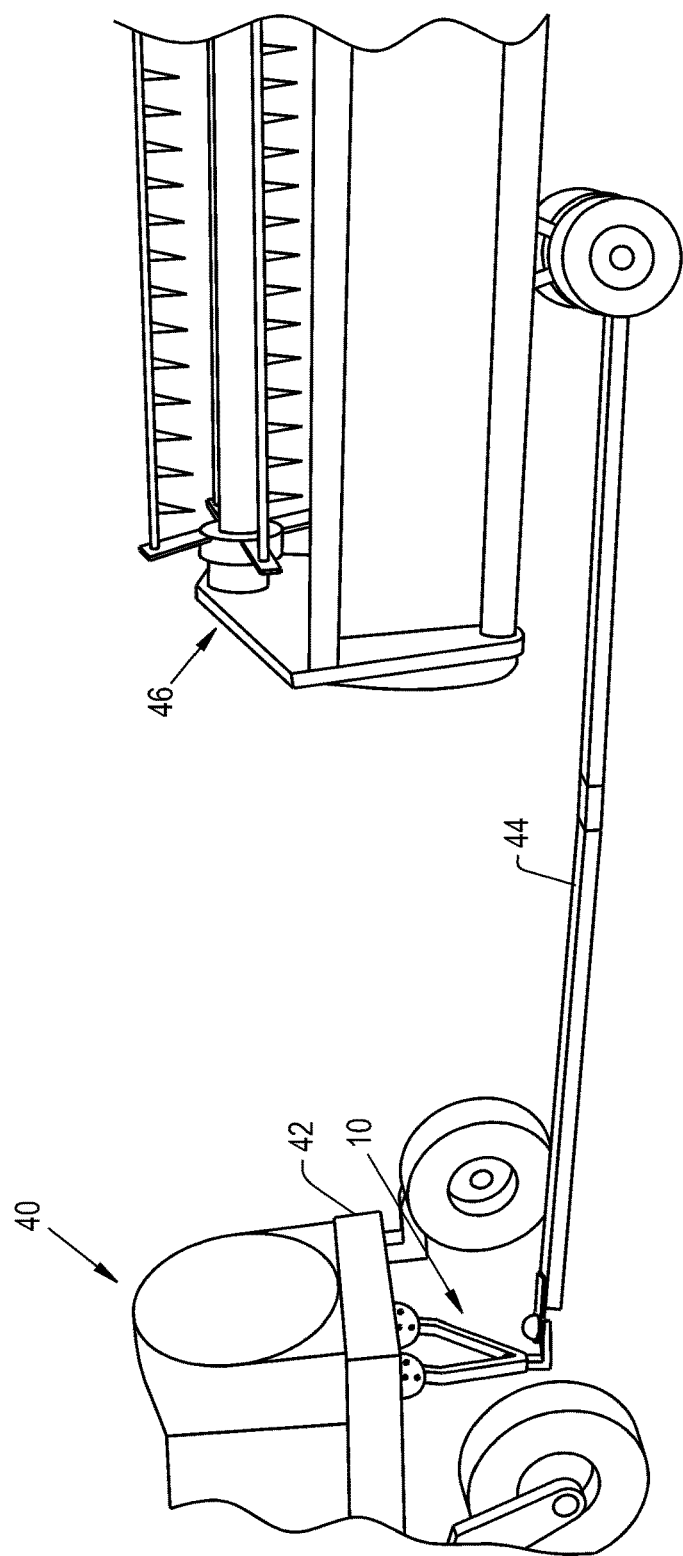
FIG. 3 is a perspective view of the hitch system of FIG. 1 mounted to an agricultural vehicle and being used for transporting an implement.

Brackets 12 are composed of any metallic material and are configured to be any rigid shape capable of attachment to the chassis 42 of an agricultural machine 40 (FIG. 3). The attachment of brackets 12 to chassis 42 can be of a permanent nature such as by weldment, or of a temporary nature by any attachment devices such as screws, bolts, etc. (not shown).

In the embodiment shown, there are four flanges 14. Each flange 14 is composed of a similar material as bracket 12 and is permanently attached to bracket 12 by weldment or other means; alternatively, flange 14 and bracket 12 can be manufactured as a single piece. Flange 14 has a through-hole 16 for detachable locking pin 18 and at least two through-holes 20 and 21 for detachable locking pin 22. Flange 14 can be any shape, and is shown in FIG. 1 as a semi-circular configuration where the "diameter" of the semicircle is the portion where the flange 14 is attached to bracket 12. The centers of through holes 20 and 21 on flange 14 are on the same circumference of an imaginary circle with the center of through-hole 16 on flange 14 being the center point of the imaginary circle.

In the embodiment shown, frame 24 includes two arms 26 and a hitch shaft receiver 34. Arms 26 include a first end 28 and second end 30. The cross-section shown is rectangular; however, any other cross-sectional shape is possible including square, oval, or circular. First end 28 has a through-hole 31 for detachable locking pin 18 and a through-hole 32 for detachable locking pin 22.

Hitch shaft receiver 34 includes first end 35, second end 36, and third end 37. First end 35 is attached to second end 30 of arms 26, discussed further in this specification. Second end 36 is coaxial along axis A-A with first end 35, with through-hole 38 passing through both ends. The cross-section of through-hole 38 is any configuration which will accept a standard hitch shaft 56, discussed below. Third end 37 is at a planar angle α from its longitudinal axis B-B to axis A-A. The angular value of angle α is between 45 degrees and 135 degrees, depending upon the desired agricultural vehicle and implement characteristics. Through-hole 39 passes between third end 37 and second end 36, and is of the same cross-sectional geometry as through-hole 38. Although designated as a through-hole, through-hole 39 may have less than its cross-sectional geometry at second end 36 as it has at third end 37 as a result of the angle α. Second end 36 and third end 37 include through-holes 50 and 52, respectively, for the insertion of a hitch shaft 56.

Figure 2:
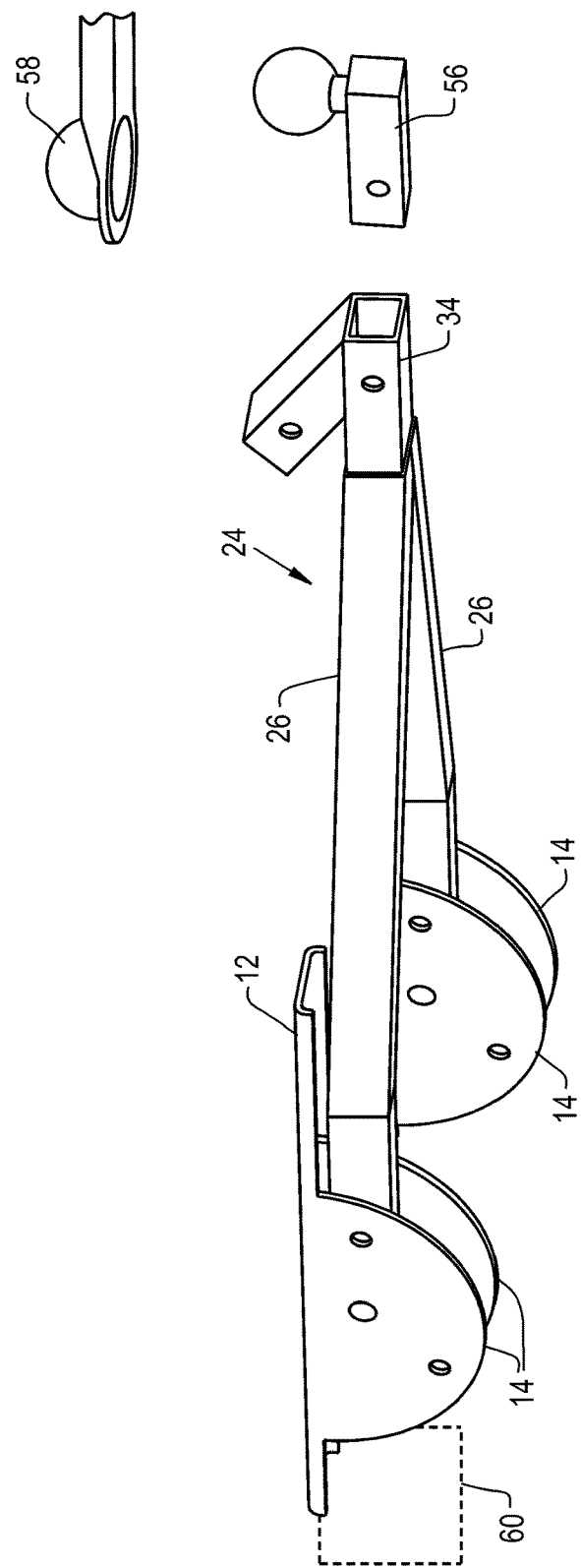
FIG. 2 is a perspective view of the hitch system of FIG. 1 in a field use configuration.
Figure 4:
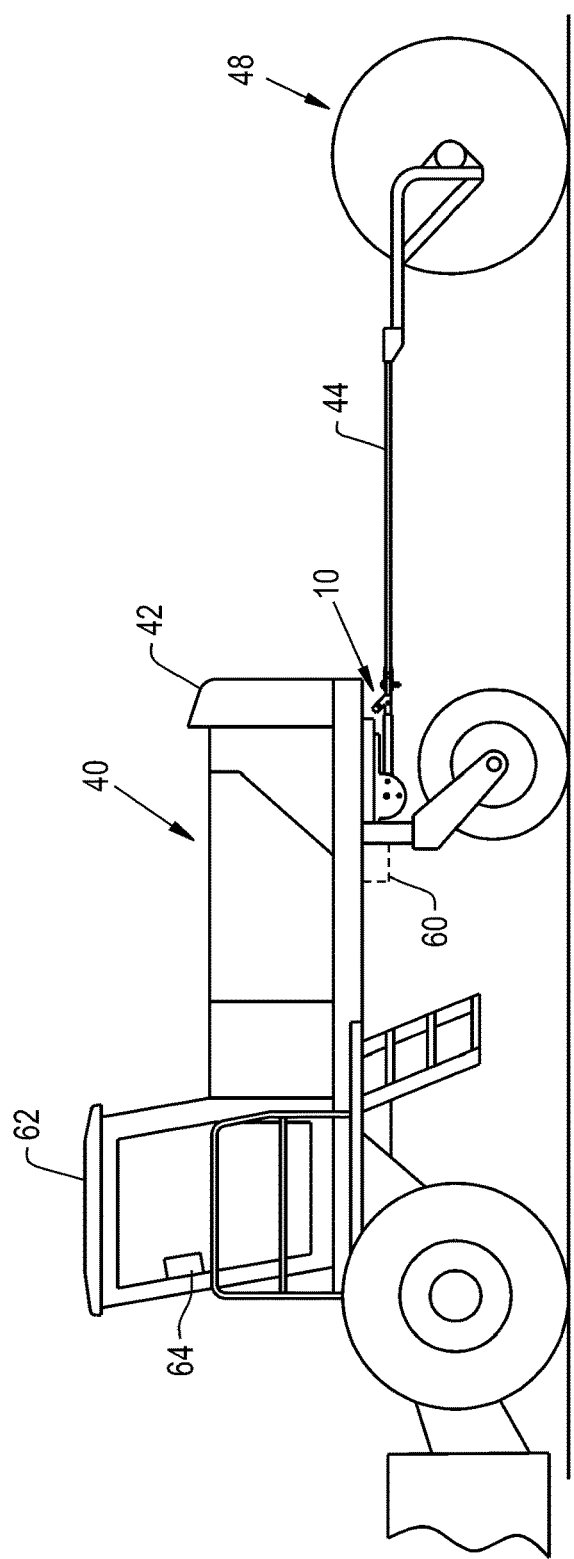
FIG. 4 is a side view of the hitch system of FIG. 1 mounted to an agricultural vehicle and being used for towing an implement during field use.

Now referring to FIGS. 2-4, with continued reference to FIG. 1, the assembly and operation of hitch system 10 is explained. As previously described and shown in preferred embodiment FIGS. 1-2, two flanges 14 are fixed to each bracket 12. Each pair of flanges 14 are parallel to each other and spaced apart far enough that arms 26 can pass freely between them. Brackets 12 with attached flanges 14 are attached to chassis 42 of agricultural machine 40, typically parallel to each other and at a distance from each other to provide stability to the working mechanism.

As previously noted, frame 24 preferentially includes two arms 26 and a hitch shaft receiver 34. Arms 26, when assembled, are connected to one another at their second ends 30. They may be connected by welding or any other mechanical means. First ends 28 of arms 26 are co-planar and at a distance enabling them to be simultaneously inserted between flanges 14 on brackets 12. Hitch shaft receiver 34 is attached by mechanically fixing first end 35 to the joined second ends 30 of arms 26. When attached, through-hole 38 is preferentially coplanar with arms 26.

Frame 24 is pivotally attached by detachable locking pin 18 between each pair of flanges 14 by through-holes 16 on flanges 14 and through-holes 31 on the first ends 28 of arms 26, thereby allowing frame 24 to swing in a circular manner. Preferentially, there are two positions for frame 24 on hitch assembly 10. At both positions, the frame is locked via detachable locking pins 22 through each of the through-holes 20 and 21 on flanges 14 and through-holes 32 on the first ends 28 of arms 26.

The first position is shown in FIGS. 1 and 3. In this position, with the frame 24 locked at a generally downward position via detachable locking pins 22 through through-holes 20 on flanges 14 and through-holes 32 on the first ends 28 of arms 26, and a standard ball 58 and hitch shaft 56 attached to through-hole 39 on third end 37 of hitch shaft receiver 34, a connection 44 can be made between agricultural machine 40 and implement 46. This connection advantageously allows agricultural machine 40 to tow implement 46 from location to location, for example on public roadways. As shown in FIG. 3, in the first position, the arms 26 of the frame 24 are rotated generally vertically downward so that the receiver 34 is located underneath the chassis 42 of the agricultural machine 40, and the receiver 34 is located at a first height which is lower than its height in the second position during field operation. For instance, FIGS. 1 and 3 illustrate the arms 26 in the first position in which a right angle or an obtuse angle is created with respect to the horizontal plane of the chassis 42. In other words, in the first position, the frame 24 is downwardly rotated so that the longitudinal axis B-B of the third end 37 is substantially horizontal in order to accommodate the standard ball 58 and hitch shaft 56. Also, due to the angle of the frame 24 in the first position, the receiver 34 is positioned closer to the front wheels of the agricultural machine 40 (FIG. 3).

The second position is shown in FIGS. 2 and 4. In this position, with the frame 24 locked at a generally horizontal position via detachable locking pins 22 through through-holes 21 on flanges 14 and through-holes 32 on the first ends 28 of arms 26, and a standard ball 58 and hitch shaft 56 attached to through-hole 38 on second end 36 of hitch shaft receiver 34, a connection 44 can be made between agricultural machine 40 and implement 48. This connection advantageously allows agricultural machine 40 to tow implement 48 through a field for normal agricultural duties; for example, agricultural machine 40 may be a self-propelled windrower towing a swath roller behind it. In this position, hitch assembly 10 is advantageously up and out of the way of contacting crops as agricultural machine 40 proceeds through the field.

The frame 24 is typically rotated from position to position manually; however, in an alternate embodiment shown in FIGS. 2 and 4, apparatus 60 may be used to assist such rotation under power. For example, apparatus 60 may be one of a hydraulic, electric, or pneumatic apparatus and controlled at its location or remotely by a switch 64 in cab 62 of agricultural machine 40.

While a hitch assembly has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural machine, comprising:
    a chassis defining a horizontal plane; and
    a hitch assembly attached to the chassis and capable of coupling an implement to the chassis, the hitch assembly including:
        at least one bracket for attachment to the chassis;
        a frame with at least one arm, each said arm having a first end and a second end, said first end of the at least one arm pivotally connected to the at least one bracket by a pivotable connector such that the frame is rotatable between a plurality of implement attachment positions;
        a receiver with at least one opening attached to the second end of the at least one arm; and
        a lock to secure the frame with respect to the chassis in a selected one of the plurality of implement attachment positions, the plurality of positions comprising at least a first towing position configured for towing an implement for transportation from one location to another and a second towing position configured for towing an implement while in an agricultural field, wherein in the first towing position the frame is locked at a generally downward vertical position relative to the horizontal plane of the chassis and the receiver is located at a first height, and in the second towing position the frame is locked in a generally horizontal position and the receiver is located at a second height.

2. The agricultural machine of claim 1, wherein the at least one bracket includes two brackets.

3. The agricultural machine of claim 2, wherein the at least one arm includes two arms in a V configuration, said two arms separated from each other at the first ends and joined at the second ends to commonly attach to the receiver.

4. The agricultural machine of claim 1, wherein the pivotable connector when installed permits rotation with respect to a horizontal axis.

5. The agricultural machine of claim 1, wherein the at least one bracket comprises an attachment point oriented and configured for attaching an implement when the frame is in the first towing position and a second attachment point oriented and configured for attaching an implement when the frame is in the second towing position.

6. The agricultural machine of claim 1, wherein the at least one bracket has a plurality of through-holes to lock the frame in the plurality of positions.

7. The agricultural machine of claim 1, wherein the agricultural machine is a self-propelled windrower.

8. A hitch assembly for use in an agricultural machine, the hitch assembly comprising:
    at least one bracket;
    a frame with at least one arm, each said arm having a first end and a second end, said first end of the at least one arm pivotally attached to the at least one bracket by a pivotable coupler and said second end having a receiver, the pivotable coupler configured for permitting adjustment of the height of the receiver with respect to a chassis;
    the receiver comprising a connector configured for attaching an implement; and
    a movable lock configured for securing the frame with respect to the chassis in a plurality of implement attachment positions, the plurality of implement attachment positions comprising at least a first towing position configured for towing an implement for transportation from one location to another and a second towing position configured for towing an implement while in an agricultural field, wherein in the first towing position the receiver is located at a first height, and in the second towing position the frame is locked in a generally horizontal position and the receiver is located at a second height, and further in the first towing position the frame is locked at a generally downward vertical position relative to the generally horizontal position of the frame in the second towing position.

9. The hitch assembly of claim 8, wherein the at least one bracket includes two brackets.

10. The hitch assembly of claim 9, wherein the at least one arm includes two arms in a V configuration, said two arms separated from each other at the first ends and joined at the second ends to commonly attach to the receiver.

11. The hitch assembly of claim 8, wherein the pivotable coupler is a detachable pin.

12. The hitch assembly of claim 8, wherein the connector comprises a first connector location oriented for attaching an implement when the frame is in the first towing position and a second connector location oriented and configured for attaching an implement when the frame is in the second towing position.

13. The hitch assembly of claim 8, wherein the at least one bracket has a plurality of through-holes to lock the frame in a plurality of positions.

* * * * *